United States Patent
Jung et al.

(10) Patent No.: US 10,439,345 B2
(45) Date of Patent: Oct. 8, 2019

(54) INTERFACE FOR CONNECTING PORTABLE ELECTRONIC DEVICE WITH VEHICLE

(71) Applicants: RENAULT s.a.s., Boulogne-Billancourt (FR); JITEL GLOBAL Co., Ltd., Uiwang-si (KR); 2BEONE SOLUTIONS Co., Ltd., Seoul (KR)

(72) Inventors: Chan Jung, Yongin-si (KR); Jeong Cheol Park, Suwon-si (KR); Hyung Jin Seo, Seoul (KR)

(73) Assignees: RENAULT s.a.s., Boulogne-Billancourt (FR); JITEL GLOBAL Co., Ltd., Uiwang-si (KR); 2BEONE SOLUTIONS Co., Ltd., Seoul (KR)

( * ) Notice: Subject to any disclaimer, the term of this patent is extended or adjusted under 35 U.S.C. 154(b) by 0 days.

(21) Appl. No.: 15/540,323

(22) PCT Filed: Dec. 29, 2015

(86) PCT No.: PCT/KR2015/014369
§ 371 (c)(1),
(2) Date: Jun. 28, 2017

(87) PCT Pub. No.: WO2016/108557
PCT Pub. Date: Jul. 7, 2016

(65) Prior Publication Data
US 2018/0006418 A1    Jan. 4, 2018

(30) Foreign Application Priority Data

Dec. 29, 2014 (KR) .................. 10-2014-0191583
Nov. 26, 2015 (KR) .................. 10-2015-0166485

(51) Int. Cl.
*H01R 31/06* (2006.01)
*B60R 11/02* (2006.01)
(Continued)

(52) U.S. Cl.
CPC ............ *H01R 31/065* (2013.01); *B60R 11/02* (2013.01); *B60R 11/0241* (2013.01);
(Continued)

(58) Field of Classification Search
CPC ... H01R 31/065; B60R 11/02; B60R 11/0241; B60R 16/03
(Continued)

(56) References Cited

U.S. PATENT DOCUMENTS 5,230,016 A * 7/1993 Yasuda .................. H02J 7/0044
                                                          379/426
6,266,544 B1 * 7/2001 Tomura ............... B60R 11/0241
                                                          455/557
(Continued)

FOREIGN PATENT DOCUMENTS

KR    10-2008-0045307 A    5/2008
KR    10-2013-0063659 A    6/2013
KR    10-2013-0064272 A    6/2013

OTHER PUBLICATIONS

Korean Office Action dated Sep. 1, 2017, for KR Paten Application No. 10-2015-0166485, 6 pages, English translation submitted herewith.
(Continued)

*Primary Examiner* — Alexander Gilman
(74) *Attorney, Agent, or Firm* — Oblon, McClelland, Maier & Neustadt, L.L.P.

(57) ABSTRACT

An interface device for connecting a portable electronic device to a vehicle includes a holding module for receiving a portable electronic device with a display, and an adaptor module for connecting the portable electronic device to a vehicle. The holding module has a slot into which the portable electronic device is inserted and a front opening exposing the display of the portable electronic device, and
(Continued)

an edge portion of the display is covered by a front part of the holding module.

15 Claims, 3 Drawing Sheets

(51) Int. Cl.
| | | |
|---|---|---|
| *B60R 16/03* | (2006.01) | |
| *H01R 12/70* | (2011.01) | |
| *F16M 11/04* | (2006.01) | |
| *F16M 11/10* | (2006.01) | |
| *H04M 1/60* | (2006.01) | |
| *H04M 1/725* | (2006.01) | |
| *H04M 1/04* | (2006.01) | |
| *H04N 5/225* | (2006.01) | |
| *H04N 5/64* | (2006.01) | |
| *F16M 13/00* | (2006.01) | |
| *B60R 11/00* | (2006.01) | |
| *H04N 7/01* | (2006.01) | |

(52) U.S. Cl.
CPC ........... *B60R 16/03* (2013.01); *F16M 11/041* (2013.01); *F16M 11/10* (2013.01); *F16M 13/00* (2013.01); *H01R 12/7076* (2013.01); *H04M 1/04* (2013.01); *H04M 1/6091* (2013.01); *H04M 1/7253* (2013.01); *H04M 1/72527* (2013.01); *H04N 5/2251* (2013.01); *H04N 5/64* (2013.01); *B60R 2011/0075* (2013.01); *B60R 2011/0294* (2013.01); *H04N 7/01* (2013.01)

(58) Field of Classification Search
USPC .......................................................... 439/34
See application file for complete search history.

(56) References Cited

U.S. PATENT DOCUMENTS

| | | | | |
|---|---|---|---|---|
| 6,301,534 B1* | 10/2001 | McDermott, Jr. ...... | B62D 5/001 | 701/41 |
| 6,636,790 B1* | 10/2003 | Lightner ............. | G01M 15/102 | 701/31.4 |
| 6,665,524 B1* | 12/2003 | Niemann ............. | H04B 1/3888 | 248/309.1 |
| 7,158,092 B2* | 1/2007 | Shen ................ | H04M 1/04 | 343/878 |
| 7,407,143 B1* | 8/2008 | Chen ................. | B60R 11/0241 | 248/309.1 |
| 7,711,468 B1* | 5/2010 | Levy ................. | B60W 30/143 | 340/441 |
| 7,778,023 B1* | 8/2010 | Mohoney ............. | G06F 1/1632 | 312/223.2 |
| 8,214,004 B2* | 7/2012 | Taxis ................ | B60K 37/06 | 345/168 |
| 8,490,937 B2* | 7/2013 | Crain ................ | G01C 15/00 | 224/929 |
| 8,635,091 B2* | 1/2014 | Amigo ............... | G07C 5/008 | 705/35 |
| 8,638,557 B2* | 1/2014 | Tsai ................. | F16M 11/041 | 248/919 |
| 8,744,540 B2* | 6/2014 | Tomasini ............ | H04M 1/04 | 455/569.2 |
| 9,070,168 B2 | 6/2015 | Amigo et al. | | |
| 9,408,456 B2* | 8/2016 | Hart ................. | A45F 5/021 | |
| 9,517,731 B2* | 12/2016 | Dry .................. | B60R 11/02 | |
| 9,729,186 B1* | 8/2017 | Dill ................. | H04B 1/3888 | |
| 9,797,543 B2* | 10/2017 | Lin .................. | F16M 11/041 | |
| 2003/0120395 A1* | 6/2003 | Kacel ............... | B62D 65/00 | 701/1 |
| 2004/0142659 A1* | 7/2004 | Oesterling .......... | G07C 5/008 | 455/11.1 |
| 2006/0105819 A1* | 5/2006 | Liao ................. | B60R 11/0241 | 455/569.2 |
| 2007/0197264 A1* | 8/2007 | Itsukaichi ........... | H04B 1/082 | 455/569.2 |
| 2007/0262223 A1* | 11/2007 | Wang ................ | B60R 11/0241 | 248/346.07 |
| 2012/0162891 A1* | 6/2012 | Tranchina ........... | B60R 11/0252 | 361/679.26 |
| 2012/0248160 A1* | 10/2012 | Seimetz ............. | A45F 5/00 | 224/183 |
| 2013/0151068 A1* | 6/2013 | Lee ................. | B60K 37/02 | 701/36 |
| 2014/0114696 A1 | 4/2014 | Amigo et al. | | |
| 2014/0128049 A1 | 5/2014 | Aoki et al. | | |
| 2014/0263931 A1* | 9/2014 | Chen ................ | F16M 11/041 | 248/576 |
| 2015/0269791 A1 | 9/2015 | Amigo et al. | | |
| 2018/0025264 A1* | 1/2018 | Maier ............... | G06K 19/077 | |

OTHER PUBLICATIONS

Written Opinion for KR Patent Application 10-2015-0166485, submitted Nov. 3, 2017, 12 pages. English translation submitted herewith.
Korean Office Action dated Dec. 1, 2016, for KR Patent Application No. 10-2015-0166485, 12 pages. English translation submitted herewith.
Written Opinion for KR Patent Application 10-2015-0166485, submitted Jun. 1, 2017, 13 pages. English translation submitted herewith.
International Search Report dated Apr. 12, 2016, in PCT/KR2015/014369, filed Dec. 29, 2015.

\* cited by examiner

[FIG. 1]
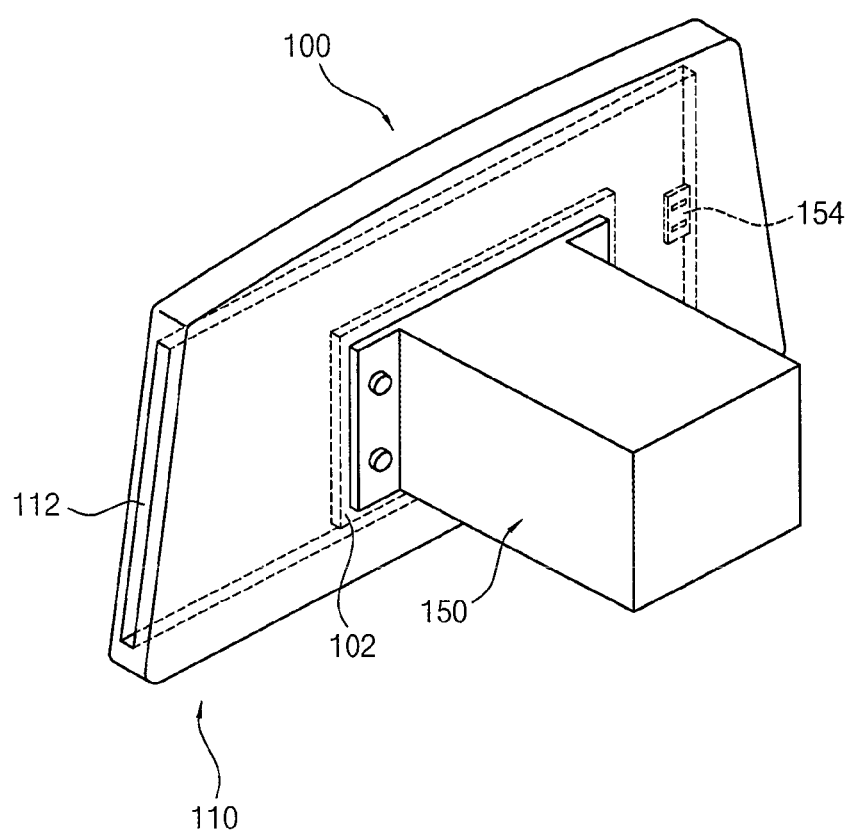

[FIG. 2]
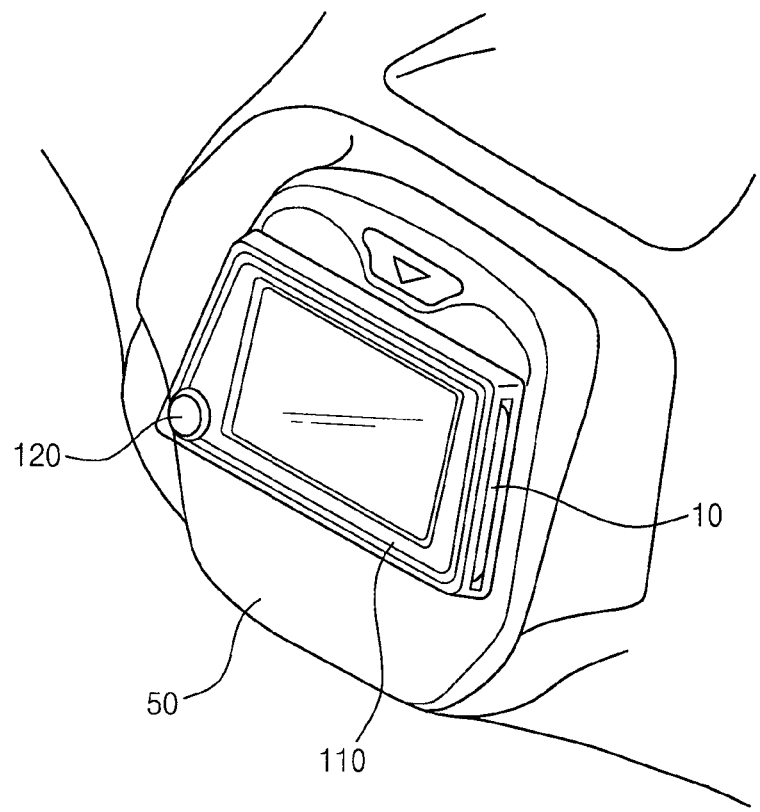
[FIG. 3]
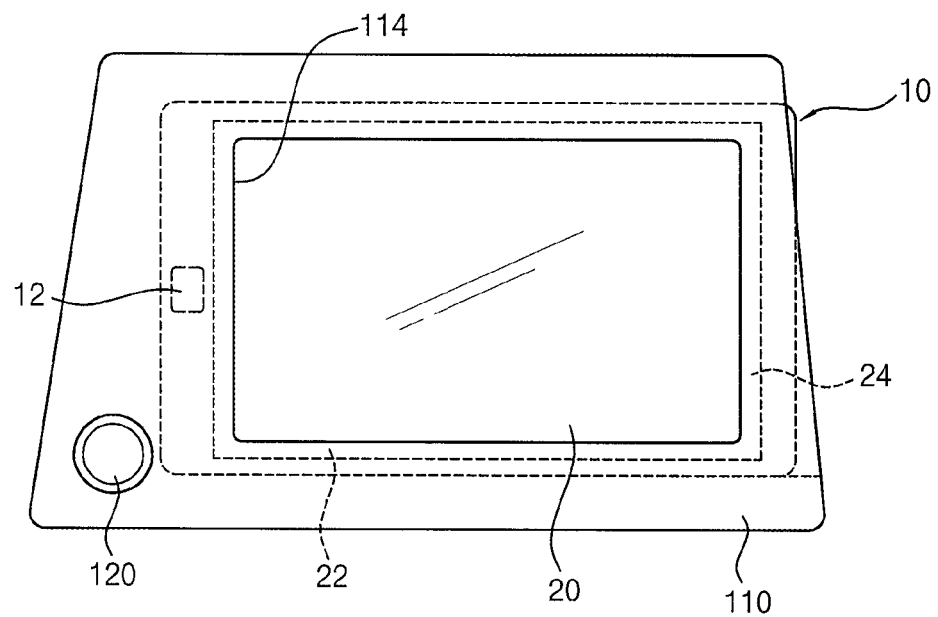

[FIG. 4]
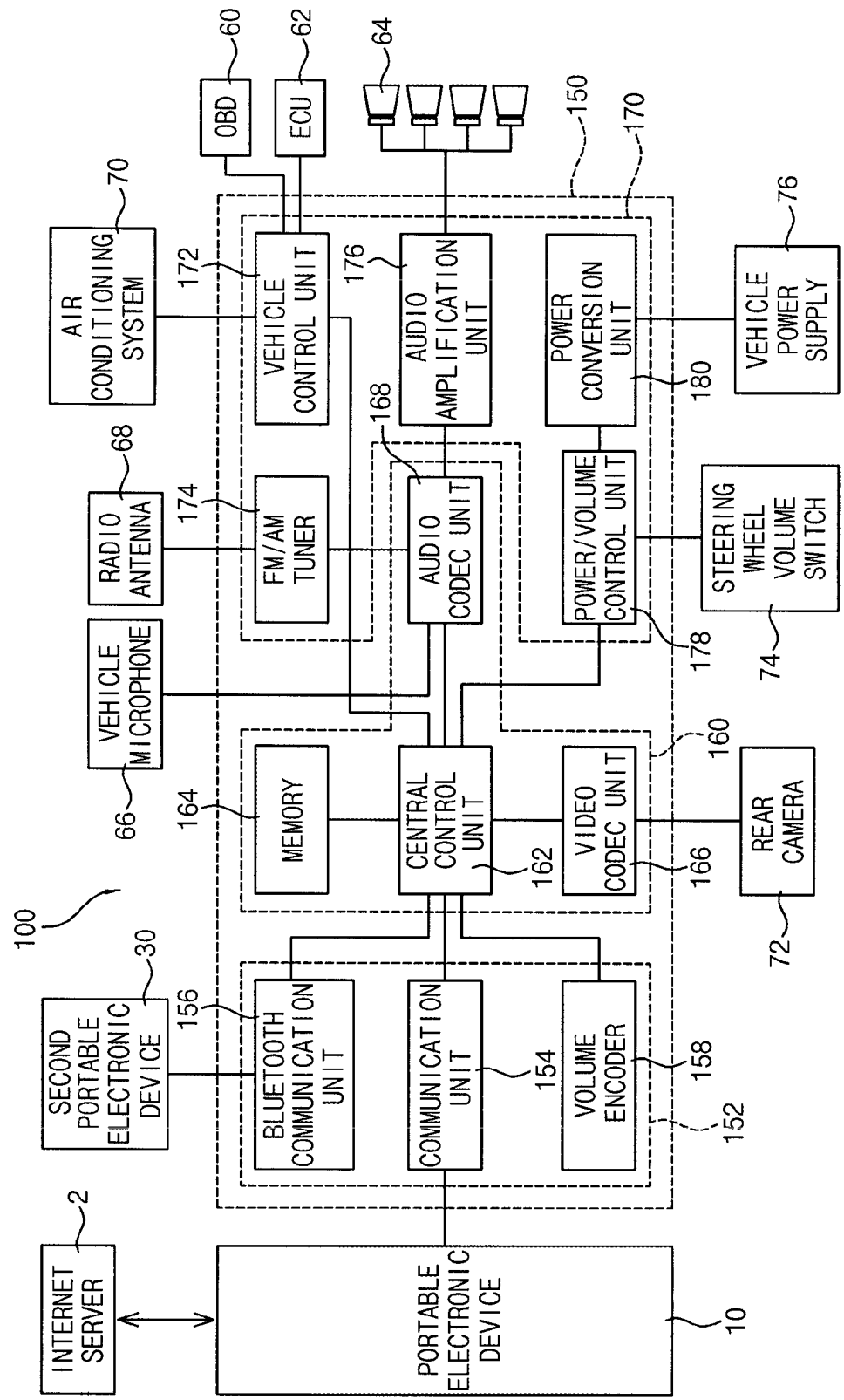

INTERFACE FOR CONNECTING PORTABLE ELECTRONIC DEVICE WITH VEHICLE

TECHNICAL FIELD

The present invention relates to an interface device for connecting a portable electronic device to a vehicle, and more particularly, to an interface device for detachably connecting a portable electronic device such as a tablet personal computer (PC), a smartphone, or the like to a vehicle.

BACKGROUND ART

Recently, telematics terminals for providing various multimedia services, vehicle diagnosis information, or the like to drivers have been widely spread. For example, the telematics terminals may provide, to drivers, various functions such as navigation, burglar alarm, emergency rescue signaling (e.g., SOS), remote diagnosis, consumables management, handsfree portable communication, living information provision, Internet access, and the like.

Portable electronic devices such as tablet PCs, smartphones, and the like may provide functions similar to the functions of the telematics terminals. In general, a driver may dispose such a portable electronic device on a dashboard of a vehicle using a vehicle mount, and may use a navigation function or may conveniently use a handsfree function through a microphone and speakers of the vehicle.

However, in the case of mounting a portable electronic device in a vehicle using a vehicle mount, a locked state of the mount may be released or the portable electronic device may be separated from the mount while the vehicle is driven. Furthermore, it may be difficult to check driving information or diagnosis information of the vehicle using the portable electronic device. In particular, the driver may be interfered with while driving the vehicle if a navigation screen of the portable electronic device is switched to another application screen by a notification function of the portable electronic device. Moreover, the driver may cause a traffic accident while manipulating the portable electronic device to check a notification message.

DISCLOSURE OF THE INVENTION

Technical Problem

Some embodiments of the present invention may provide an interface device for connecting a portable electronic device to a vehicle so that the portable electronic device is safely used in the vehicle while the vehicle is driven.

Technical Solution

According to some embodiments of the present invention, an interface device for connecting a portable electronic device to a vehicle may include a holding module for receiving a portable electronic device with a display, and an adaptor module for connecting the portable electronic device to a vehicle. Particularly, the holding module may have a slot into which the portable electronic device is inserted and a front opening exposing the display of the portable electronic device. Further, an edge portion of the display may be covered by a front part of the holding module.

According to some embodiments of the present invention, a communication terminal for a connection between the portable electronic device and the adaptor module may be provided in the slot.

According to some embodiments of the present invention, when the portable electronic device is connected to the adaptor module, a vehicle mode of the portable electronic device may be performed.

According to some embodiments of the present invention, a navigation program may be run as a background program in the vehicle mode.

According to some embodiments of the present invention, a notification message of the portable electronic device may be blocked while the vehicle mode is performed.

According to some embodiments of the present invention, wherein a home button of the portable electronic device and an indicator region disposed at the edge portion of the display may be covered by the front part of the holding module.

According to some embodiments of the present invention, the holding module may include a power switch for adjusting volume of the portable electronic device, turning on/off the display, or tuning on/off the portable electronic device.

According to some embodiments of the present invention, the adaptor module may include a front board for communication with the portable electronic device, a core board for controlling a system and processing data, and a main board for processing control signals and power of the vehicle.

According to some embodiments of the present invention, the adaptor module may include a Bluetooth communication unit for communication with a second portable electronic device.

According to some embodiments of the present invention, the adaptor module may include an FM/AM tuner.

According to some embodiments of the present invention, the adaptor module may include a vehicle control unit connected to an on-board diagnostics (OBD) of the vehicle to output diagnosis information of the vehicle through the display.

According to some embodiments of the present invention, the adaptor module may include a vehicle control unit for controlling an air conditioning system of the vehicle using the portable electronic device.

According to some embodiments of the present invention, the adaptor module may include a volume control unit connected to a steering wheel volume switch of the vehicle to control volume of speakers of the vehicle and output the volume of the speakers through the display.

According to some embodiments of the present invention, the adaptor module may include a video codec unit for outputting, through the display, an image signal provided from a rear camera of the vehicle.

According to some embodiments of the present invention, wherein the adaptor module may include a power conversion unit connected to a power supply of the vehicle, the power conversion unit converting a voltage of the power supply of the vehicle into a charging voltage of the portable electronic device to provide power to the portable electronic device.

Advantageous Effects

According to some embodiments of the present invention as described above, an interface device may include a holding module for receiving a portable electronic device and an adaptor module for connecting the portable electronic device to a vehicle. The holding module may have a slot to which the portable electronic device is inserted and a front opening through which the inserted portable electronic device is exposed, and a home button disposed at an edge portion of the portable electronic device and an indicator region disposed at an edge portion of the display may be covered by a front part of the holding module.

In the case where the portable electronic device is connected to the adaptor module, a vehicle mode of the portable electronic device may be performed, and, while the vehicle mode is performed, a notification message of the portable electronic device may be blocked. Therefore, a traffic accident that may occur when a driver operates a normal mode of the portable electronic device or checks the notification message may be prevented.

Furthermore, since the portable electronic device may be used as a telematics terminal of the vehicle, the cost of manufacturing the vehicle may be remarkably reduced. Moreover, since the portable electronic device may be separated from the vehicle so as to be used for other purposes when the vehicle is not driven, the usefulness of the portable electronic device may be remarkably improved.

BRIEF DESCRIPTION OF THE DRAWINGS

FIG. 1 is a schematic diagram illustrating an interface device for connecting a portable electronic device to a vehicle according to an embodiment of the present invention.

FIG. 2 is a schematic perspective view illustrating a state in which the interface device of FIG. 1 is mounted in a vehicle.

FIG. 3 is a front view of the interface device of FIG. 1.

FIG. 4 is a block diagram illustrating the adaptor module of FIG. 1.

MODE FOR CARRYING OUT THE INVENTION

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

It will be understood that when one element is referred to as being disposed on or connected to another element, it can be directly disposed on or connected to the other element, or other elements may be interposed therebetween. It will be further understood that when one element is referred to as being directly disposed on or connected to another element, there is no intervening element therebetween. The terms "first", "second", "third", and the like may be used herein to describe various items such as elements, compositions, regions, layers and/or parts, but the items are not limited by the terms.

The terminology used herein is used only for describing specific embodiments and is not intended to limit the present invention. All terms used herein, including technical or scientific terms, have the same meanings as understood by those skilled in the art unless otherwise specified. The terms such as those defined in commonly used dictionaries should be interpreted as having a meaning that is consistent with their meaning in the context of the relevant art and will not be interpreted in an idealized or overly formal sense unless expressly so defined herein.

Embodiments of the present invention are described with reference to schematic diagrams of ideal embodiments of the present invention. Therefore, modifications from the shapes of the diagrams, such as modifications to manufacturing methods and/or allowable errors, would be sufficiently predicted. Therefore, embodiments of the present invention are not limited to specific shapes of regions illustrated in the diagrams, but cover deviations from the shapes. The elements illustrated in the drawings are merely schematic and are not intended to describe accurate shapes of the elements or limit the scope of the present invention.

FIG. 1 is a schematic diagram illustrating an interface device for connecting a portable electronic device to a vehicle according to an embodiment of the present invention, FIG. 2 is a schematic perspective view illustrating a state in which the interface device of FIG. 1 is mounted in a vehicle, and FIG. 3 is a front view of the interface device of FIG. 1.

Referring to FIGS. 1 to 3, an interface device 100 according to an embodiment of the present invention may be used to connect a portable electronic device 10 such as a tablet PC, a smartphone, or the like to a vehicle, wherein the portable electronic device 10 connected to the vehicle through the interface device 100 may be used as a telematics terminal.

For example, a vehicle mode which is different from a normal use mode may be installed in the portable electronic device 10. The vehicle mode may include functions such as navigation, handsfree portable communication, multimedia, broadcast reception, Internet access, etc. Furthermore, when the portable electronic device 10 is connected to the vehicle through the interface device 100, a driver may check driving information, diagnosis information, or the like of the vehicle using the portable electronic device 10.

According to an embodiment of the present invention, as illustrated in FIG. 1, the interface device 100 may include a holding module 110 for receiving the portable electronic device 10 and an adaptor module 150 for connecting the portable electronic device 10 to the vehicle. The portable electronic device 10 may include a display 20, which may include a touch panel (not shown) for receiving a user input.

The holding module 110 may be generally shaped like a rectangular plate and may be disposed on a dashboard of the vehicle. In particular, as illustrated in FIG. 2, the holding module 110 may be disposed on a center fascia 50 positioned at a center of the dash board. The center fascia 50 may have an opening into which the adaptor module 150 is inserted. The adaptor module 150 may be coupled to a rear part of the holding module 110, and may be disposed in the center fascia 50.

Referring to FIGS. 1 and 3, the holding module 110 may have a slot 112 into which the portable electronic device 10 is inserted and a front opening 114 through which the inserted portable electronic device 10 is exposed. The slot 112 may be horizontally formed through a side portion of the holding module 110, and an edge portion 22 of the display 20 may be covered by a front part of the holding module 110.

A communication terminal 154 for a connection between the portable electronic device 10 and the adaptor module 150 may be provided in the slot 112, and, when the portable electronic device 10 is sufficiently inserted into the slot 112, the communication terminal 154 may be connected to an external connection terminal of the portable electronic device 10.

In particular, in the case where the portable electronic device 10 is connected to the adaptor module 150 as described above, the vehicle mode of the portable electronic device 10 may be automatically performed. In detail, after the portable electronic device 10 is connected to the adaptor module 150, the vehicle mode may be automatically performed by a control signal provided from the adaptor module 150, and a battery of the portable electronic device 10 may be charged by the adaptor module 150.

According to an embodiment of the present invention, while the vehicle mode is performed, a navigation program may be run as a background program, and a notification message of the portable electronic device 10 may be blocked. In particular, notification messages from various programs run in a normal mode of the portable electronic device 10 may be blocked, so that the driver may be prevented from manipulating the portable electronic device 10 to check the messages.

Furthermore, as illustrated in FIG. 3, a home button 12 of the portable electronic device 10 and an indicator region 24 disposed at the edge portion 22 of the display 20 may be covered by the front part of the holding module 110. Therefore, the driver is not allowed to touch the indicator region 24 while driving the vehicle, and thus the portable electronic device 10 may be prevented from being mistakenly switched from the vehicle mode to the normal mode. As a result, a traffic accident that may be caused by driver's unnecessary manipulation of the portable electronic device 10 while driving may be prevented.

According to an embodiment of the present invention, the holding module 110 may include a power switch 120 for adjusting volume of the portable electronic device 10, turning on/off the display 20, and turning on/off the portable electronic device 10. For example, the power switch 120 may be a push/rotary button type, and the volume of the portable electronic device 10 may be adjusted by rotating the power switch 120. In particular, in the case where the volume of the portable electronic device 10 is adjusted using the power switch 120, the volume of speakers 64 of the vehicle connected to the portable electronic device 10 may be adjusted. Furthermore, by short pressing or long pressing the power switch 120, turning on/off of the display 20 or turning on/off or rebooting of the portable electronic device 10 may be performed.

Referring back to FIG. 1, the adaptor module 150 may include a case generally shaped like a square box, and may be coupled to the rear part of the holding module 110 by fastening members such as bolts or the like. Although not illustrated in the drawings in detail, connection terminals (not shown) may be arranged at the rear part or side part of the adaptor module 150 for a connection to the vehicle, more specifically, on-board diagnostics (OBD) 60, an electronic control unit (ECU) 62, the speakers 64, a vehicle microphone 66, a radio antenna 68, an air conditioning system 70, a rear camera 72, a steering wheel volume switch 74, a vehicle power supply 76, etc. of the vehicle, and a thermal insulating member 102 may be interposed between the holding module 110 and the adaptor module 150.

FIG. 4 is a block diagram illustrating the adaptor module of FIG. 1.

Referring to FIG. 4, the portable electronic device 10 may be connected to an Internet server 2 through wireless communications, and may download navigation data, Internet broadcast data, music data, etc. from the Internet server 2.

The adaptor module 150 may include a front board 152 for communication with the portable electronic device 10, a core board 160 for controlling a system and processing data, and a main board 170 for processing control signals and power of the vehicle.

The front board 152 may include a communication terminal 154 for a connection to the portable electronic device 10, a Bluetooth communication unit 156, and a volume encoder 158, and the core board 160 may include a central control unit 162, a memory device 164, a video codec unit 166, and an audio codec unit 168. Furthermore, the main board 170 may include a vehicle control unit 172, an FM/AM tuner 174, an audio amplification unit 176, a power/volume control unit 178, and a power conversion unit 180.

The communication terminal 154 may be connected to an external connection terminal of the portable electronic device 10, and the Bluetooth communication unit 156 may be used to communicate with a second portable electronic device 30. For example, the communication terminal 154 may be used to transfer control signals or data between the portable electronic device 10 and the adaptor module 150 and charge the portable electronic device 10. In the case where a tablet PC is connected to the adaptor module 150 through the communication terminal 154, the Bluetooth communication unit 156 may be used to connect a smartphone to the adaptor module 150. In particular, the Bluetooth communication unit 156 may be used to use a handsfree portable communication function based on the smartphone and the vehicle microphone 66 or play, via the tablet PC, multimedia data such as a video or music stored in the smartphone.

The volume encoder 158 may be connected to the power switch 120 of the holding module 110, and may be used to adjust the volume of the portable electronic device 10 and the speakers 64 of the vehicle. Furthermore, an on/off signal for the display 20 or an on/off signal for the portable electronic device 10 received via the power switch 120 may be transferred to the central control unit.

The central control unit 162 may be used to process commands or data or transmit/receive data, and the memory device 164 may be used to store data and software related to operation of the adaptor module 150.

The video codec unit 166 may convert an analog image signal obtained by the rear camera 72 into a digital image signal so that it can be played through the display 20, and may transmit the digital image signal to the central control unit 162. In particular, the central control unit 162 may transmit, to the portable electronic device 10, the converted image signal and a control signal for executing a video playback program of the portable electronic device 10 when the vehicle is reversed, so that the converted image signal may be played through the display 20.

Although not illustrated in the drawings, a black box device (not shown) of the vehicle may be connected to the portable electronic device 10 through the adaptor module 150, and an image signal obtained by the black box device may be played through the display 20.

The audio codec unit 168 may receive sound data from the central control unit 162, the vehicle microphone 66, the FM/AM tuner 174, or an AUX (not shown), may convert the sound data into a sound signal playable by the speakers 64 of the vehicle, and may transmit the sound signal to the audio amplification unit 176. The audio amplification unit 176 may be connected to the speakers 64 of the vehicle, and may amplify the sound signal to transmit the sound signal to the speakers 64 of the vehicle.

The FM/AM tuner 174 may be connected to the radio antenna 68, and may receive a radio broadcast signal to transfer the radio broadcast signal to the audio codec unit 168. Furthermore, the portable electronic device 10 may download radio broadcast data from the Internet server 2, and may play the radio broadcast data through the speakers 64 of the vehicle.

The vehicle control unit 172 may be connected to the OBD 60 and/or the ECU 62 of the vehicle, and may be used to output diagnosis information and driving information of the vehicle through the display 20. Furthermore, the vehicle control unit 172 may be used to control the air conditioning system 70 including an air conditioner and a heater. In particular, the vehicle mode of the portable electronic device 10 may include an application program for displaying the diagnosis information and the driving information and an application program for controlling the air conditioning system 70.

The power/volume control unit 178 may be connected to the steering wheel volume switch 74 of the vehicle, and may be used to control the volume of the speakers 64 of the vehicle. The power/volume control unit 178 may be connected to the portable electronic device 10 through the central control unit 162, and the volume of the speakers 64 may be displayed by the display 20.

Furthermore, the power/volume control unit 178 may be connected to the power conversion unit 180 to charge the battery of the portable electronic device 10. The power conversion unit 180 may be connected to the vehicle power supply 76, and may convert a power supply voltage of the vehicle into a charging voltage of the portable electronic device 10 to provide power to the portable electronic device 10.

As described above, according to some embodiments of the present invention, the interface device 100 may include the holding module 110 for receiving the portable electronic device 10 and the adaptor module 150 for connecting the portable electronic device 10 to the vehicle. The holding module 110 may have the slot 112 to which the portable electronic device 10 is inserted and the front opening 114 through which the inserted portable electronic device 10 is exposed, and the home button 12 disposed at an edge portion of the portable electronic device 10 and the indicator region 24 disposed at the edge portion 22 of the display 20 may be covered by the front part of the holding module 110.

In the case where the portable electronic device 10 is connected to the adaptor module 150, the vehicle mode of the portable electronic device 10 may be performed, and, while the vehicle mode is performed, a notification message of the portable electronic device 10 may be blocked. Therefore, a traffic accident that may occur when the driver operates the normal mode of the portable electronic device 10 or checks the notification message may be prevented.

Furthermore, since the portable electronic device 10 may be used as a telematics terminal of the vehicle, the cost of manufacturing the vehicle may be remarkably reduced. Moreover, since the portable electronic device 10 may be separated from the vehicle so as to be used for other purposes when the vehicle is not driven, the usefulness of the portable electronic device 10 may be remarkably improved.

Although the present invention has been described with reference to preferred embodiments of the present invention, it will be readily understood by those skilled in the art that various modifications and changes can be made thereto without departing from the spirit and scope of the present invention defined by the appended claims.

The invention claimed is:

1. An interface device for connecting a portable electronic device to a vehicle, the interface device comprising:
   a holding module including a slot into which a portable electronic device with a display is inserted and a front opening on a front face of the holding module to expose the display of the portable electronic device, and an edge portion of the display is covered by the front face of the holding module;
   an adaptor module coupled to a rear part of the holding module to connect the portable electronic device inserted into the slot to a vehicle; and
   a power switch for adjusting a volume of the portable electronic device, turning on/off the display, and turning on/off the portable electronic device,
   wherein the power switch is positioned on the front face of the holding module, adjacent to the opening, and faces outward from the front face,
   wherein when the portable electronic device is connected to the adapter module, a vehicle mode of the portable electronic device is performed, and
   wherein a home button of the portable electronic device and an indicator region disposed at an edge portion of the display are covered by the front face of the holding module so as to prevent a driver from switching an operation mode of the portable electronic device from the vehicle mode to a normal mode while driving the vehicle.

2. The interface device of claim 1, further comprising:
   a communication terminal configured to connect with an external connection terminal of the portable electronic device, the communication terminal being provided in the slot.

3. The interface device of claim 1, wherein the adaptor module comprises:
   a front board for communication with the portable electronic device;
   a core board for controlling a system and processing data; and
   a main board for processing control signals and power of the vehicle.

4. The interface device of claim 1, wherein the adaptor module comprises a Bluetooth communication unit for communication with a second portable electronic device.

5. The interface device of claim 1, wherein the adaptor module comprises an FM/AM tuner.

6. The interface device of claim 1, wherein the adaptor module comprises a vehicle control unit connected to an on-board diagnostics (OBD) of the vehicle to output diagnosis information of the vehicle through the display.

7. The interface device of claim 1, wherein the adaptor module comprises a vehicle control unit for controlling an air conditioning system of the vehicle using the portable electronic device.

8. The interface device of claim 1, wherein the adaptor module comprises a volume control unit connected to a steering wheel volume switch of the vehicle to control volume of speakers of the vehicle and output the volume of the speakers through the display.

9. The interface device of claim 1, wherein the adaptor module comprises a video codec unit for outputting image signals provided from a rear camera of the vehicle through the display.

10. The interface device of claim 1, wherein the adaptor module comprises a power conversion unit connected to a power supply of the vehicle, the power conversion unit converting a voltage of the power supply of the vehicle into a charging voltage of the portable electronic device to provide power to the portable electronic device.

11. The interface device of claim 1, wherein the power switch includes a push and rotary button such that the power switch adjusts the volume of the portable electronic device upon rotation of the power switch and turns on/off the display and the portable electronic device upon pressing of the power switch.

12. The interface device of claim 1, wherein the home button is positioned on a bottom of the portable electronic device and, when the portable electronic device is inserted in the slot, the home button is covered by a left side of the front face of the holding module.

13. The interface device of claim 12, wherein the indicator region is positioned on a top of the display of the portable electronic device and, when the portable electronic device is inserted in the slot, the indicator region is covered by a right side of the front face of the holding module.

14. The interface device of claim 1, wherein the indicator region is positioned on a top of the display of the portable electronic device and, when the portable electronic device is inserted in the slot, the indicator region is covered by a right side of the front face of the holding module.

15. The interface device of claim 1, wherein when the portable electronic device is inserted in the slot, the front face of the holding module extends continuously around the edge portion of the display of the portal electronic device to cover all of a left edge, a right edge, a top edge, and a bottom edge of the display.

* * * * *